United States Patent [19]

Cutting

[11] 4,323,819

[45] Apr. 6, 1982

[54] SPIN-TUNED MAGNETRON

[75] Inventor: Alan B. Cutting, Maidenhead, England

[73] Assignee: E M I - Varian Limited, Hayes, England

[21] Appl. No.: 138,445

[22] Filed: Apr. 8, 1980

[30] Foreign Application Priority Data

May 1, 1979 [GB] United Kingdom ............... 15145/79

[51] Int. Cl.[3] ............................................. H01G 25/50

[52] U.S. Cl. .............................. 315/39.61; 315/39.51; 315/39.55

[58] Field of Search ............... 315/39.61, 39.55, 39.57, 315/39.59

[56] References Cited

U.S. PATENT DOCUMENTS

| | | | |
|---|---|---|---|
| 2,931,943 | 4/1960 | Backmark | 315/39.61 |
| 3,247,421 | 4/1966 | Backmark | 315/39.61 |
| 3,343,031 | 9/1967 | Backmark | 315/39.55 |
| 3,365,609 | 1/1968 | Barbasso, Jr. | 315/39.61 X |
| 3,412,285 | 11/1968 | Gerard | 315/39.71 |
| 3,441,796 | 4/1969 | Cooper | 315/39.61 |
| 3,899,715 | 8/1975 | Esteron et al. | 315/39.61 |
| 3,904,919 | 9/1975 | Farney et al. | 315/39.51 |
| 4,131,825 | 12/1978 | Mattsson | 315/39.61 |
| 4,143,300 | 3/1979 | Cutting et al. | 315/39.61 |

OTHER PUBLICATIONS

"The Spin Magnetron", A Simple and Compact Solution to Broad-Band Frequency Agility Radar by F. Sellbery et al., presented to the 1968 International Devices Meeting in Washington, D.C. Oct. 23, 1968 by William Adikes, Amperex Electronic Corporation.

*Primary Examiner*—Saxfield Chatmon, Jr.
*Attorney, Agent, or Firm*—Fleit & Jacobson

[57] ABSTRACT

A spin tuned magnetron has a spinner the axially facing end of which lies in an inclined plane and an anode vane ring having an annular flange the end face of which lies in an inclined plane so that the amount of overlap of the flange and spinner varies as the spinner rotates. (In the FIG. 4A the spinner and the ring are shown spaced far apart; in practice they are spaced so that the planes coincide when parallel).

10 Claims, 8 Drawing Figures

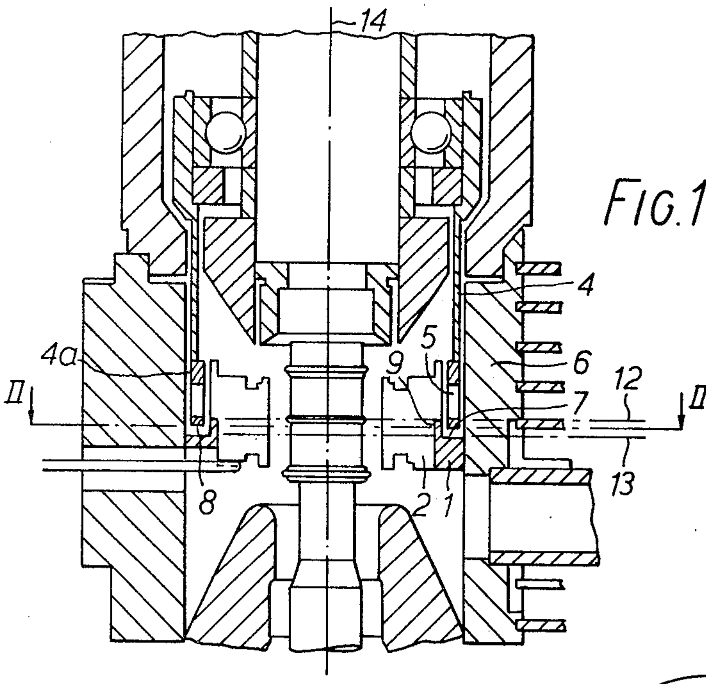
FIG. 1
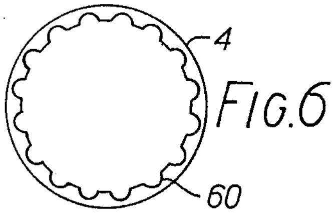
FIG. 6
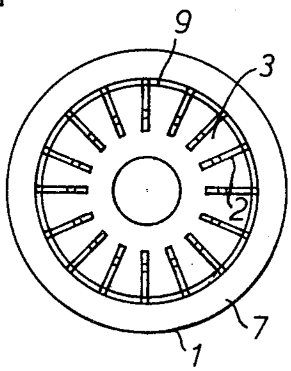
FIG. 2
FIG. 3
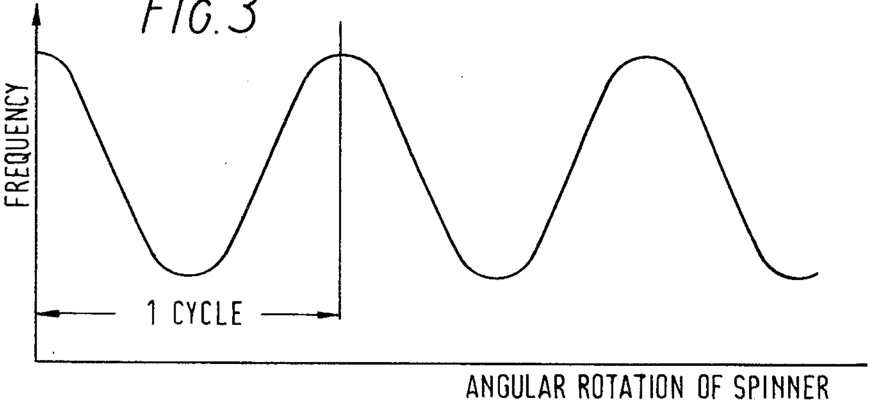

SPIN-TUNED MAGNETRON

The present invention relates to a spin-tuned magnetron.

A known spin tuned magnetron comprises a cavity magnetron and a spinner which varies the coupling between cavities in the magnetron and thus varies the frequency of the magnetron cyclically.

It is an object of the present invention to provide another manner of variation of frequency.

According to the invention there is provided a spin tuned magnetron including:

In a spin tuned magnetron including:

a spinner rotatable about an axis of rotation, anode vanes, an anode vane ring supporting the anode vanes, the ring having an annular flange extending parallel to the axis, the spinner having a cylindrical portion which overlaps the anode vanes and which is disposed radially outwardly of the flange, the improvement wherein the axially facing end surfaces of the said cylindrical portion of the spinner and the flange lie in respective planes inclined relative to a reference plane perpendicular to the said axis.

In an embodiment the planes are equally inclined (although they may be unequally inclined). As a result of the inclination of the said end surfaces the angle between the flange and the said portion of the spinner, i.e. the degree to which the flange and the said portion are parallel, varies as the spinner rotates, thus changing the frequency of the magnetron; hereinafter this variation is referred to as variation in "parallelism" of the spinner and flange.

In an embodiment the said portion of the spinner includes holes for varying the coupling between the cavities of the magnetron, as the spinner rotates. In the embodiment, the centre frequency of the range of variation of frequency due to the holes is modulated by the variation in frequency due to the variable parallelism of the spinner and flange.

Figure 4A:
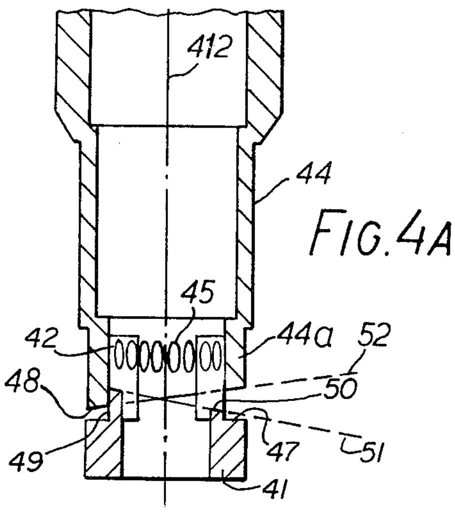
Figure 4B:
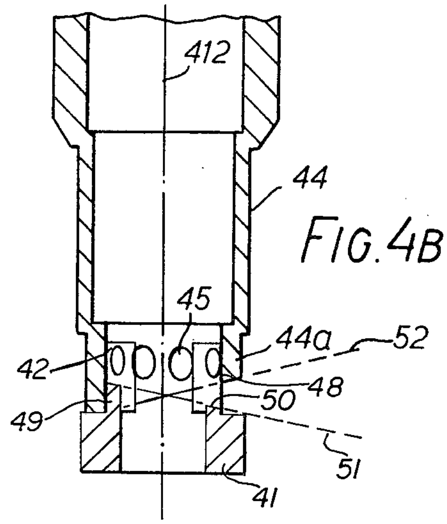
Figure 5A:
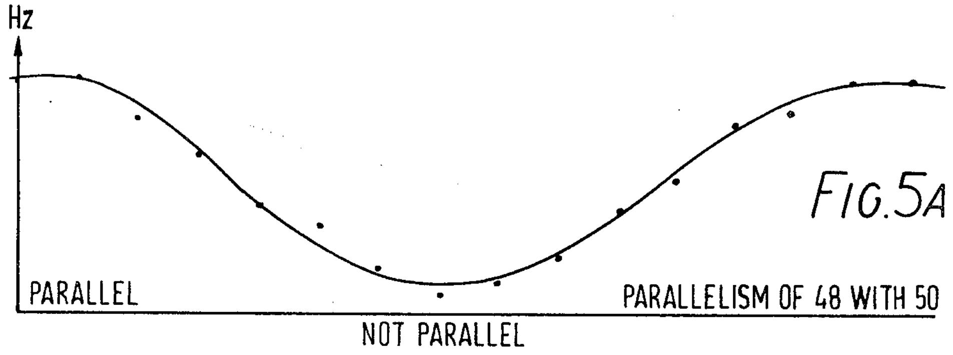

For a better understanding of the present invention, reference will now be made, by way of example, to the accompanying drawings, in which:

FIG. 1 is an axial section through a known spin-tuned magnetron,

FIG. 2 shows a detail of the magnetron of FIG. 1, being a section on line II—II of FIG. 1, FIG. 3 is a graph illustrating the variation in frequency produced by tuning the magnetron of FIG. 1, FIGS. 4A and B are schematic views in axial section of details of alternative magnetrons in accordance with the present invention, FIGS. 5A and B are graphs illustrating the variation in frequency produced by tuning the magnetron of FIG. 4, and FIG. 6 is an end view of a spinner showing a modification thereof.

Referring to FIGS. 1 and 2 the known spin-tuned magnetron includes a spinner 4, anode vanes 2, an anode vane ring 1 and an anode block 6. The vanes 2 are mounted inwardly directed on the ring 1, and, as shown in FIG. 2, define between neighbouring vanes resonant cavities such as 3.

The spinner 4 is in the form of a tube coaxial with the anode vane ring 1 and has an end portion 4*a* in which there are regularly distributed holes 5 equal in number to the number of cavites 3, which is typically 16. The end portion 4*a* rotates in an annular channel defined between the vanes 2, the block 6 and the ring 1, the channel having a U-section adjacent each vane; the end portion 4*a* surrounds the vanes 2 over at least part of their length.

The anode vane ring 1 has a top surface portion 7 having a uniform spacing from the bottom edge 8 of the spinner (as illustrated by parallel lines II—II and 13 perpendicular to the axis of rotation 14) and an annular flange 9, upstanding from the surface portion 7, inwardly of the spinner 6. The spinner 4 and the flange 9 overlap by a constant amount (as indicated by the parallel lines II—II and 12).

In operation, as the spinner rotates relative to the vanes 2, cavities 3 and ring 1, the holes 5 move past the vanes and cavities, and the frequency varies in dependence upon the proportion of hole overlapping a vane or a cavity and thus changing the coupling between adjacent cavities. When a hole overlaps a cavity to the maximum extent the frequency is a maximum; when the hole overlaps a vane to the maximum extent the frequency is a minimum.

This variation in frequency is shown in FIG. 3, where 1 cycle of frequency variation corresponds to an angular rotation of the spinner equal to $2\pi$/(number of holes or cavities) radians.

In an example of a magnetron in accordance with the invention, the anode ring 1 and the spinner end portion 44*a* are modified as shown in FIGS. 4A and 4B. In FIGS. 4A and 4B items equivalent to items in FIG. 1 are denoted by the same references as in FIG. 1 but with the prefix 4. The shown modification provides an additional variation in frequency as shown in FIGS. 5A and B.

In the example of FIG. 4A the spinner and ring are spaced axially so that when they are parallel (i.e. the spinner is rotated 180° relative to the position shown in FIG. 4) there is no axial spacing between them.

In contrast to the magnetron of FIG. 1, in the magnetron of FIG. 4A the end surface 48 of the spinner end portion 44*a* lies in an inclined plane (as shown by line 52) and furthermore, the end surface 50 of the flange 49 also lies in an inclined plane, as indicated by line 51. The angles of inclination are equal in the shown example, but may be different. As a result, as the spinner rotates relative to the anode ring 41, the angle between, or the parallelism of, the flange 49 and the end portion 44*a* varies. The variation of the parallelism changes the coupling of the anode with the annulus defined between the end of the spinner and the anode vane ring, and the frequency of the magnetron anode is changed. As shown in FIG. 5, one cycle of this frequency variation corresponds to one complete rotation ($2\pi$) of the spinner. The frequency is a maximum when the spinner and flange are parallel; the frequency is a minimum at the portion shown in FIG. 4A where the spinner and flange are out of parallel to the maximum extent.

Figure 5B:
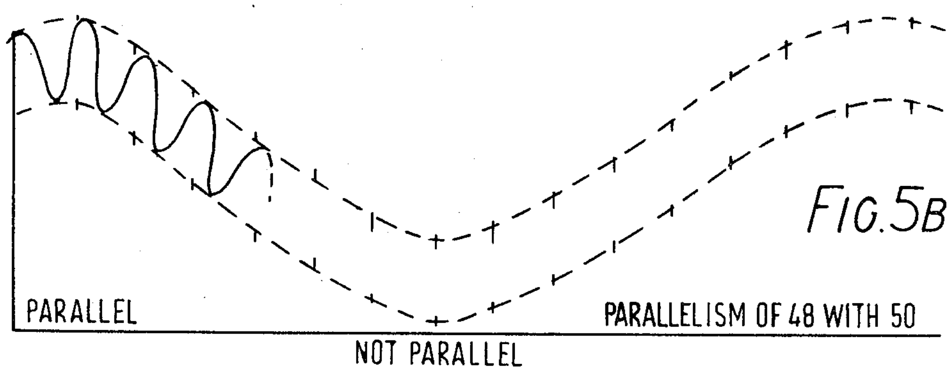

The change of frequency due to the change of coupling between cavities caused by the holes 45 moving behind the vanes is minimally affected. Thus, the frequency variation due to the variation in overlap of the end portion 44*a* and the flange modulates the centre frequency of the range of frequency variation due to the holes as shown in FIG. 5B.

FIGS. 4A and 4B show the inclination of the ends of the spinner 44 and flange 49 much exaggerated. In a practical embodiment of the invention, the change in height across the diameter of both the spinner and flange was a fraction of a millimeter eg. a few tenths of a millimeter. Furthermore in this practical embodiment eight holes 45 were provided, regularly distributed in the spinner 44, whilst 16 cavities and vanes were provided. Reducing the number of holes reduces the bandwidth of magnetron.

FIG. 4B schematically shows the spinner and anode ring of the alternative magnetron in which eight holes 45 are provided and the angles of inclination of the planes 51 and 52 are unequal. The spinner and ring shown are used with the 16 cavities shown in FIG. 2. In this case, (and in the case of FIG. 4A) the spinner and ring are in practice positioned so that the centres of the ellipses defined by faces 48 and 50 are coincident.

As shown in FIG. 6, the holes 45 may be replaced by curved rececces or scallops 60 to vary the coupling between cavities. The number of recesses may be the same as the number of holes which would be used.

What I claim is:

1. In a spin tuned magnetron including:

a spinner rotatable about an axis of rotation, anode vanes, an anode vane ring supporting the anode vanes, the ring having an annular flange extending parallel to the axis, the spinner having a cylindrical portion which overlaps the anode vanes and which is disposed radially outwardly of the flange, the improvement wherein axially facing end surfaces of the said cylindrical portion of the spinner and the flange lie in respective planes inclined relative to a reference plane perpendicular to the said axis.

2. A magnetron according to claim 1, wherein the angles of inclination of the said planes relative to the said reference plane are equal.

3. A magnetron according to claim 1, wherein the angles of inclination of the said planes relative to the said reference plane are unequal.

4. A magnetron according to claim 1, 2 or 3, wherein the said cylindrical portion of the spinner includes a plurality of means for varying the coupling between cavities defined between the vanes as the spinner rotates.

5. A magnetron according to claim 4, wherein the said varying means are holes in the spinner.

6. A magnetron according to claim 4, wherein the said varying means are recesses in the internal face of the spinner.

7. A magnetron according to claim 5 or 6, wherein there are fewer varying means than vanes.

8. A magnetron according to claim 5 or 6, wherein the number of vanes equals the number of holes.

9. A magnetron according to claims 1, 2 or 3, wherein the tangent of the angle of inclination of either of the said planes relative to the said reference plane is a fraction of a millimeter divided by the diameter of the spinner and flange associated with that plane.

10. A magnetron according to claim 1, 2 or 3 wherein the centers of ellipses defined by the said end surfaces are coincident.

* * * * *